United States Patent
Park et al.

(10) Patent No.: US 9,641,695 B2
(45) Date of Patent: May 2, 2017

(54) APPARATUS AND METHOD FOR CONTROLLING POLICY AND CHARGING IN FLAT NETWORKS

(71) Applicant: Samsung Electronics Co., Ltd., Gyeonggi-do (KR)

(72) Inventors: Jung-Shin Park, Seoul (KR); Ki-Suk Kweon, Gyeonggi-do (KR); Yeong-Moon Son, Gyeonggi-do (KR); Antony Franklin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/271,325

(22) Filed: May 6, 2014

(65) Prior Publication Data

US 2014/0329495 A1 Nov. 6, 2014

(30) Foreign Application Priority Data

May 6, 2013 (KR) ........................ 10-2013-0050536

(51) Int. Cl.
*H04M 15/00* (2006.01)
*H04W 36/00* (2009.01)
*H04L 12/24* (2006.01)
*H04W 4/24* (2009.01)
*H04W 8/20* (2009.01)
*H04W 84/04* (2009.01)
*H04L 12/14* (2006.01)

(52) U.S. Cl.
CPC ........ *H04M 15/66* (2013.01); *H04L 41/0893* (2013.01); *H04M 15/8038* (2013.01); *H04W 36/0033* (2013.01); *H04L 12/1407* (2013.01); *H04L 12/1425* (2013.01); *H04W 4/24* (2013.01); *H04W 8/20* (2013.01); *H04W 84/045* (2013.01)

(58) Field of Classification Search
CPC ........................... H04L 12/14; H04L 12/1407
See application file for complete search history.

(56) References Cited

U.S. PATENT DOCUMENTS

2008/0229385 A1 9/2008 Feder et al.
2009/0182883 A1* 7/2009 Giaretta et al. ............... 709/228
(Continued)

OTHER PUBLICATIONS

"Policy and Charging Control" 3rd Generation Partnership Project (3GPP), TS 23.203 V10.6.0 (Mar. 2012) Technical Specification.*
(Continued)

*Primary Examiner* — Thomas Lett (57) ABSTRACT

A method for performing policy and charging control (PCC) in a decentralized network architecture includes performing, by a first base station (BS), a procedure of initial network entry of a mobile station (MS), determining, by the first BS, first PCC rules for the MS by using at least one of subscription information and application information regarding the MS, enforcing, by the first BS, control and charging for data communication of the MS based on the first PCC rules, generating second PCC rules to be applied to a second BS and transferring the second PCC rules to the second BS, when detecting a handover of the MS to the second BS, and requesting the MS to connect to the second BS. Other embodiments including a method for performing PCC in the seconds BS, and the first BS and the second BS for performing PCC are disclosed.

20 Claims, 5 Drawing Sheets

(56) References Cited

U.S. PATENT DOCUMENTS

2009/0228956 A1    9/2009  He et al.
2010/0142373 A1*   6/2010  Jin et al. ...................... 370/230
2011/0065435 A1    3/2011  Pancorbo Marcos et al.

OTHER PUBLICATIONS

International Search report dated Aug. 14, 2014 in connection with PCT/KR2014/003914; Samsung Electronics Co. Ltd.; 4 pages.
Written Opinion dated Aug. 14, 2014 in connection with PCT/KR2014/003914; Samsung Electronics Co. Ltd.; 6 pages.

\* cited by examiner

APPARATUS AND METHOD FOR CONTROLLING POLICY AND CHARGING IN FLAT NETWORKS

CROSS-REFERENCE TO RELATED APPLICATION AND CLAIM OF PRIORITY

The present application is related to and claims the benefit under 35 U.S.C. §119(a) of a Korean patent application No. 10-2013-0050536 filed in the Korean Intellectual Property Office on May 6, 2013, the entire disclosure of which is incorporated herein by reference.

TECHNICAL FIELD

The present disclosure generally relates to a flat network system, and more particularly, to an apparatus and method for controlling user policy and charging information based on movement of a terminal in a wireless communication network.

BACKGROUND

Next-generation wireless communication systems consider employing wireless communication systems that use high-frequency bands, such as millimeter Waves (mmW), in order to support high-capacity data services. In a case of a system using high-frequency bands, a Base Station (BS) has a small cell radius due to the short communication distance between a BS and a Mobile Station (MS), and an increasing number of BSs are installed to secure the service area of the MS). The small cell radius of the BS and the increase in the number of BSs may cause an increase in the number of handovers of the MS) due to inter-cell movement of the MS). As a result, the amount of occurring signaling and consumption of system resources increase significantly.

The increase in the number of BSs increases requirements for the processing capacity of an access gateway that is connected to the BS to transfer data to the BS and manage service information and authentication information for users. Consequently, in a small-cell environment, a centralized network architecture is difficult to apply.

In a small-cell-based wireless communication system, a network architecture is needed which increases a data transmission speed while reducing the overload of the system due to frequent handovers. To solve problems caused by a small-cell architecture, a decentralized flat network architecture has been considered. Therefore, there is a need for providing functions such as a new handover scheme for supporting the mobility of the MS), a user policy and charging control scheme, and a Quality of Service (QoS) providing scheme in a decentralized flat network.

SUMMARY

To address the above-discussed deficiencies, it is a primary object to provide a method and apparatus for transmitting and receiving information in a wireless communication system.

Another aspect of the present disclosure is to provide an apparatus and method for controlling user policy and charging information taking into account movement of an SS in a decentralized flat network architecture.

Another aspect of the present disclosure is to provide an apparatus and method for controlling user policy and charging information in a wireless communication system having a decentralized flat network architecture.

Another aspect of the present disclosure is to provide a method and apparatus for reducing signal overload in a network due to frequent handovers of a MS and a decentralized architecture and consistently applying subscriber policy and charging regardless of movement of the MS.

In accordance with an aspect of the present disclosure, there is provided a method for performing policy and charging control (PCC) in a decentralized network architecture, the method includes performing, by a first Base Station (BS), a procedure of initial network entry of an MS, determining, by the first BS, first PCC rules for the MS by using at least one of subscription information and application information regarding the MS, enforcing, by the first BS, control and charging for data communication of the MS based on the first PCC rules, generating second PCC rules to be applied to a second BS and transferring the second PCC rules to the second BS, upon detecting a handover of the MS to the second BS, and requesting the MS to connect to the second BS.

In accordance with another aspect of the present disclosure, there is provided a method for performing PCC in a decentralized network architecture, the method includes receiving, by a second BS, first PCC rules for an MS from a first BS when the MS hands over to the second BS from the first BS, enforcing, by the second BS, control and charging with respect to data communication of the MS based on the first PCC rules, and generating second PCC rules to be used in a third BS and transferring the second PCC rules to the third BS, upon detecting a handover of the MS to the third BS.

In accordance with another aspect of the present disclosure, there is provided a BS apparatus for performing PCC in a decentralized network architecture, the BS apparatus includes a wireless interface configured to perform a procedure of initial network entry of an MS, a PCC controller configured to determine first PCC rules for the MS by using at least one of subscription information and application information regarding the MS, enforce control and charging for data communication of the MS based on the first PCC rules, and generate second PCC rules to be applied to a new BS when the MS hands over to the new BS, and a BS interface configured to transfer the second PCC rules to the new BS.

In accordance with another aspect of the present disclosure, there is provided a BS apparatus for performing PCC in a decentralized network architecture, the BS apparatus includes a BS interface configured to receive first PCC rules for an MS from a previous BS when the MS hands over from the previous BS and a PCC controller configured to enforce control and charging with respect to data communication of the MS based on the first PCC rules and generate second PCC rules to be used in a new BS when the MS hands over to the new BS, in which the second PCC rules are transferred to the new BS by the BS interface.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and architectures.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, an embodiment of the present disclosure will be described in detail with reference to the accompanying drawings. In a description of the present disclosure, well-known functions and architectures which may unnecessarily obscure the subject matter of the present disclosure will not be described. Terms used herein are defined for functions in the present disclosure and may vary according to users, intentions of operators, or practice. Thus, the terms should be defined more clearly based on the entire contents of various embodiments of the present disclosure.

Hereinafter, in an embodiment of the present disclosure, a description will be made of a procedure for setting and controlling user policy and charging policy information in an initial network entry process of a mobile station (MS) and a procedure for resetting or changing a user policy and a charging policy to be used in a new base station (BS) when the SS moves between cells in a decentralized flat communication system. The present disclosure also proposes a policy and charging control (PCC) procedure applicable to a need for changing service characteristics while maintaining an existing service even after the MS moves between cells.

Figure 1:
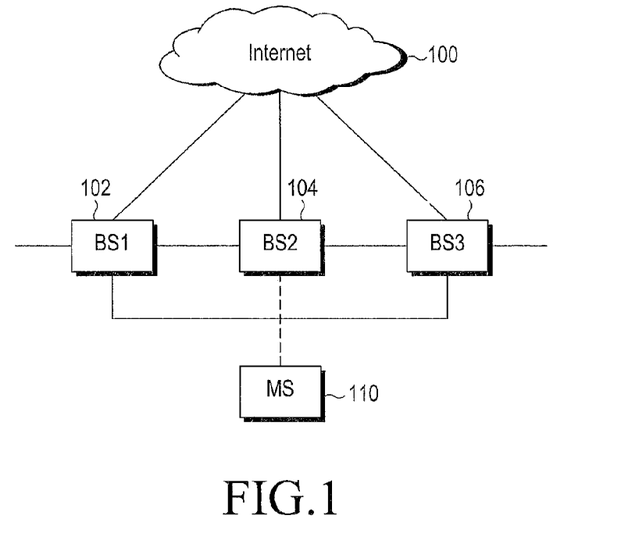
FIG. 1 illustrates a communication system having a decentralized flat architecture to which the present disclosure is applied.

FIG. 1 illustrates a communication system having a decentralized flat architecture to which the present disclosure is applied.

Referring to FIG. 1, a wireless communication system can include a plurality of BSs 102, 104, and 106 configured to serve an MS 110. The MS 110 can be provided with a data service through at least one of the BSs 102, 104, and 106, and the BSs 102, 104, and 106 that serve the MS 110 connect the MS 110 to the Internet 100. Although not shown, a BS controller or a gateway for controlling BSs can be further included depending on a system configuration type. The following description will be made using an example in which the BS controller or the gateway does not exist and assuming that the BS has a function of the BS controller or the gateway. However, it will be obvious to those of ordinary skill in the art that the present disclosure can also be applied to a case where the BS controller or the gateway exists separately.

Figure 2:
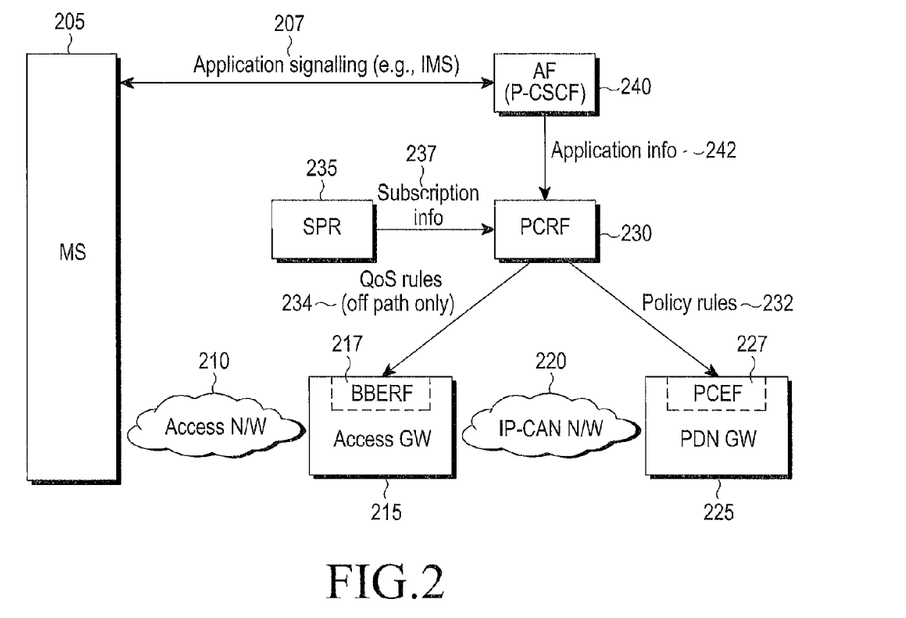
FIG. 2 illustrates a system architecture for Policy and Charging Control (PCC) according to an embodiment of the present disclosure.

FIG. 2 illustrates a system architecture for Policy and Charging Control (PCC) according to an embodiment of the present disclosure.

Referring to FIG. 2, an MS 205 can be connected to an Access Gateway (AGW) 215 through an access network 210, and the AGW 215 is connected to a Packet Data Network (PDN) GW 225 through an Internet Protocol (IP)—Connectivity Access Network (CAN) network 220. The AGW 215 can include a Bearer Binding and Event Reporting Function (BBERF) 217 that acquires and manages information 234 about QoS rules of the MS 205 from a Policy and Charging Rules Function (PCRF) 230 existing on the network to control an access bearer of the MS 205 based on the information 234. Likewise, the PDN GW 225 can include a Policy and Charging Enforcement Function (PCEF) 227 that acquires and manages information 232 about policy rules for the MS 205 from the PCRF 230 to manage and charge a transporting bearer for an Internet service of the MS 205 according to the information 232 and ensure policy enforcement.

The PCRF 230 collects subscription profile information 237 stored in a Subscription Profile Repository (SPR) 235 and if necessary, the PCRF 230 is provided from an Application Function (AF) 240 with application information 242 indicating applications the MS 205 is using or can use, to determine PCC rules for policy control and/or charging control for services that can be provided.

The AF 240 serves as a Proxy Call State Control Function (P-CSCF) operating as a first point for Internet connection of the MS 205 to receive information about applications from the MS 205 through application signaling. The application signaling can be transferred based on, for example, an IP Multimedia Subsystem (IMS).

The PCC rules determined by the PCRF 230 can include at least one of gating indicating availability of a particular service or a particular service type, charging, and QoS rules. For example, the PCC rules specify available service types, allocating bandwidths, and a charging rate corresponding to service types and/or the amount of data.

Figure 3:
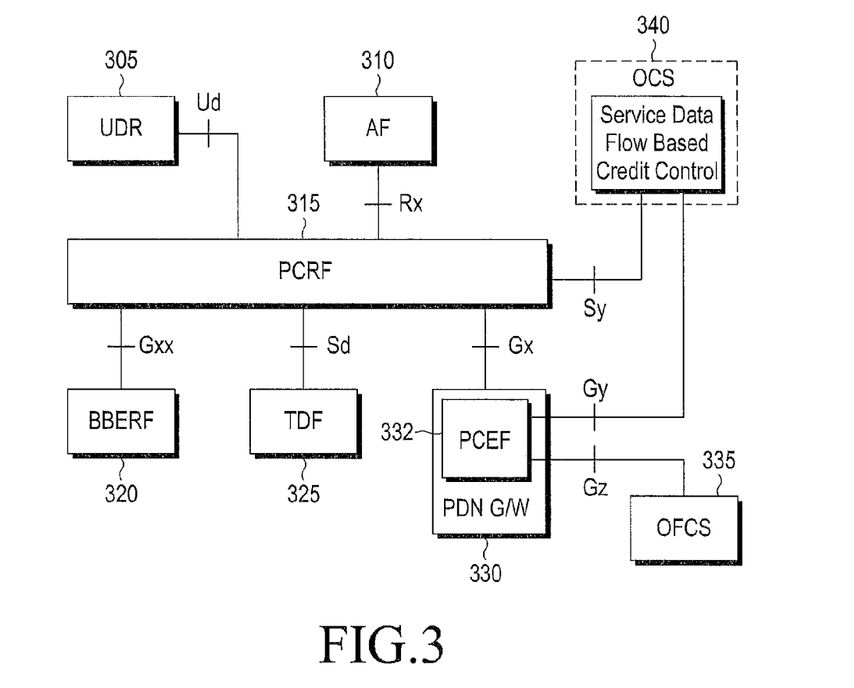
FIG. 3 illustrates an interface between functional blocks for PCC according to an embodiment of the present disclosure.

FIG. 3 illustrates an interface between function blocks for PCC according to an embodiment of the present disclosure.

Referring to FIG. 3, a PCRF 315 interworks with a BBERF 320, a Traffic Detection Function (TDF) 325, a PCEF 332, a User Data Repository (UDR) 305, an AF 310, and an Online Charging System (OCS) 340. The BBERF 320 exists in a GW that manages a bearer, for example, an AC GW or a BS, sets the bearer, detects a predetermined event occurring on the bearer, and reports the event to the PCRF 315. The TDF 325 detects traffic on the bearer, measures the amount of traffic (for example, the number of packets) if necessary, and reports the measured amount of traffic to the PCRF 315. The UDR 305 can be included in an SPR and stores subscription information necessary for determination of a policy and provides the subscription information to the PCRF 315 if necessary. The AF 310 can be included in an application server or a P-CSCF and provides application information to the PCRF 315 if required. The OCS 340 manages a Service Flow (SF) based on credit control and manages online charging.

The PCEF 332 can be provided in a PDN GW 330 or a BS and actually enforces a policy and charging. The PCEF 332 is connected with the OCS 340, and with an Offline Charging System (OFCS) 335 if necessary, to exchange information about charging.

For a high data rate service using a high-frequency band, small BSs covering a small cell can be implemented. For further improvement in efficiency, BS cooperation can be applied such that a plurality of BSs cooperate with each other to serve a single MS. The BS cooperation technique needs high credit of communication between BSs through a backhaul to provide joint transmission and coordinated scheduling for mitigating interference.

A flat network architecture is applied to increase the number of BSs increases in a small-cell environment and to support easy achievement of credit requirements for backhaul traffic and network intelligent functions at boundary nodes. In the flat network architecture, a high-layer node for integrally managing BSs is removed and the BSs directly operate as high-layer nodes. To support the flat network architecture, additional functions are needed such as mobility management, PCC, support for QoS, an idle mode, management of a context, and paging control (location tracking).

Figure 4:
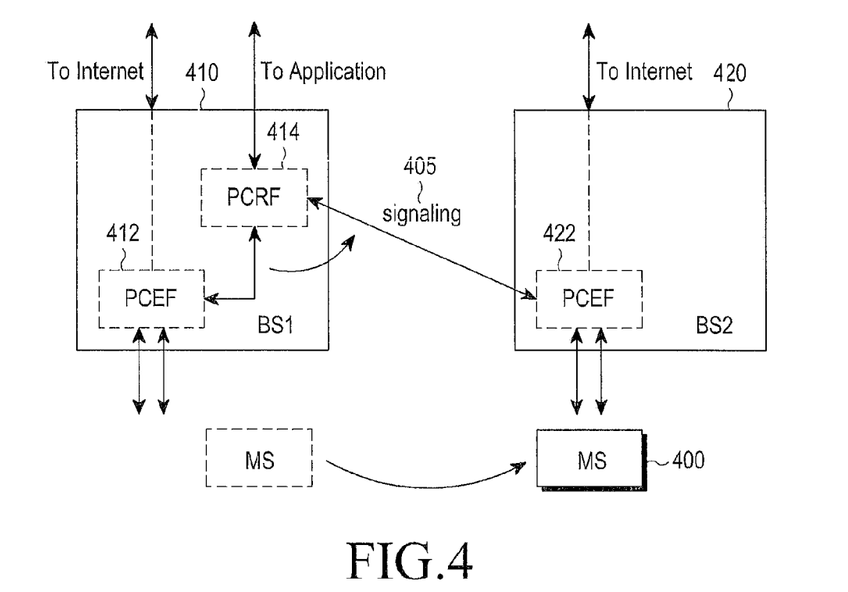
FIG. 4 illustrates a BS architecture for PCC in a flat network according to an embodiment of the present disclosure.

FIG. 4 illustrates a BS architecture for PCC in a flat network according to an embodiment of the present disclosure.

Referring to FIG. 4, a BS1 410 an MS 400 initially enters can include a PCEF 412 that actually enforces a policy and charging of the MS 400 and a PCRF 414 that determines and manages PCC rules for the MS 400. The PCEF 412 monitors a bearer between the MS 400 and the Internet to enforce a user policy and collect charging information. The PCRF 414 determines PCC rules based on application information and/or subscription information, provides the PCC rules to the PCEF 412, and if necessary, modifies the PCC rules.

As the MS 400 moves to another neighboring cell, a BS2 420 that covers the neighboring cell connects a bearer for the MS 400 and sets a PCEF 422 for enforcing a policy and charging on the bearer. The PCEF 422 needs information about PCC rules to enforce a policy and charging for the MS 400. Thus, a valid interface 405 is set between the PCRF 414 of the BS 410 and the PCEF 422 of the BS 420, and the PCRF 414 of the BS 410 transfers the PCC rules to the PCEF 422 of the BS 420 through the interface 405.

The PCC rules provide parameters for policy control and/or charging control. The policy control indicates a way for the PCRF 414 to control a bearer to the PCEF 422, and includes QoS control and/or gating control. The charging control means a procedure for applying online charging and/or offline charging to a series of packets included in a corresponding service flow. The gating control blocks or permits packets included in a corresponding service flow. The PCC rules enable detection of the service flow and can include QoS rules that define QoS parameters or can be used together with the QoS rules.

As such, when the PCRF 414 of the BS 410 the MS 400 initially connects to continuously manage the PCC rules, the interface 405 needs to be set for a new BS the MS 400 connects to each time when the MS 400 performs a handover. Thus, in a small-cell environment where the MS 400 has to frequently perform a handover, an interface between the PCRF 414 and multiple PCEFs is needed and/or a distance between the PCRF 414 and each PCEF can increase.

In the following embodiments of the present disclosure, each BS includes a function block for enforcing both determination and enforcement of PCC rules. The function block can be implemented by a processor for performing a function of integrating a PCRF with a PCEF, and will be referred to as a Policy and Charging Rules Enforcement Function (PCREF) hereinafter.

Figure 5:
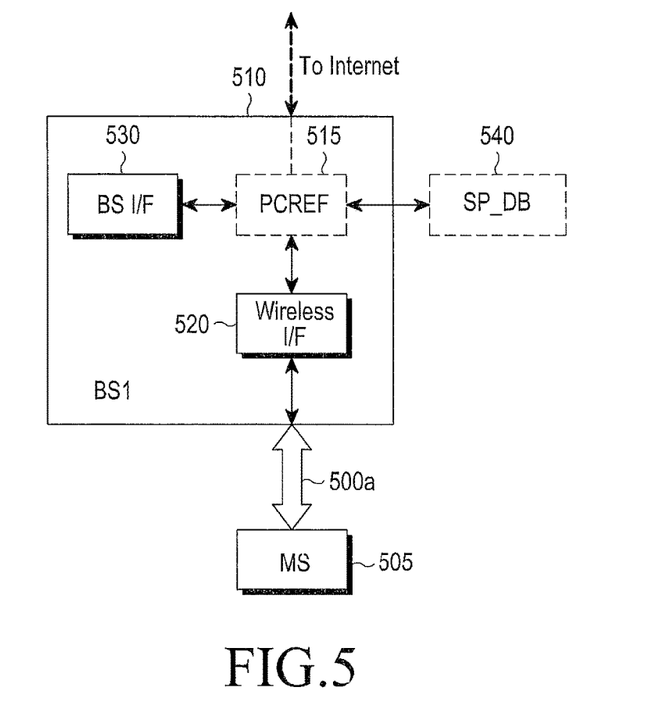
FIG. 5 illustrates a BS architecture for a wireless communication system having a decentralized flat architecture according to an embodiment of the present disclosure.

FIG. 5 illustrates a BS architecture for a wireless communication system having a decentralized flat architecture according to an embodiment of the present disclosure.

Referring to FIG. 5, in a small-cell environment, each BS 510 includes a PCREF 515 for determining or enforcing PCC rules. The PCREF 515 is activated by initial network entry or handover of an MS 505 and sets, manages, and actually enforces PCC rules. The PCC rules mean a set of information that enable detection of a service data flow and provide parameters for policy control and/or charging control.

The parameters for policy control can indicate, for example, association between a service flow and a transmission bearer, whether to block or permit packets included in a particular service flow or an application, a way to report an event occurring in relation to a transmission bearer, a QoS level (or class) permitted for each service flow, and whether to redirect packets included in a particular application. The parameters for charging control can indicate, for example, a charging mode indicating a capacity basis, a time basis, a capacity and time basis, and an event basis, and information needed for each charging mode, that is, the amount of traffic, use time, an event type, and the like.

A description will now be made of a process of setting PCC rules in initial network entry of an MS based on the illustrated BS architecture.

The MS 505 performs a process of initial network entry through a wireless interface 520 of a BS 510 and in this process, to set PCC rules to be applied to the MS 505, the BS 510 requests the PCREF 515 to refer to user's policy and charging profile information related to the MS 505. According to an embodiment, the user's policy and charging profile can be stored in the PCREF 515 or an external database 540. The external database 500 can include, for example, an SPR, a UDR, or a Home Subscriber System (HSS). When the external database 540 is used, the PCREF 515 sends a request for profile information necessary in the process of setting the PCC rules for the MS 505 to the external database 540 and receives the profile information.

The PCREF 515 sets the PCC rules to be applied to the MS 505 by referring to the policy and charging profile information. Once finishing setting the PCC rules, the PCREF 515 calls an access protocol function of the wireless interface 520 to perform the other operation for completing the initial network entry process and then actually enforces a policy and charging by using the set PCC rules during a data service.

In a wireless communication system having a decentralized flat architecture, when the MS 505 moves to a new BS, a PCREF is activated in the new BS and management, modification, and enforcement of the PCC rules for the MS 505 are managed in the new BS. The PCC rules to be applied to the new BS are provided to the PCREF of the new BS by a BS interface 530.

If the MS 505 enters the BS 510 through a handover, the BS 510 receives PCC rules to be applied to the MS 505 from an existing BS through the BS interface 530, and the PCREF 515 manages and enforces the received PCC rules. When the MS 505 moves to a new BS, the PCREF 515 reconfigures or generates PCC rules to be applied to the new BS and transfers the reconfigured or generated PCC rules to the new BS through the BS interface 530.

Figure 6:
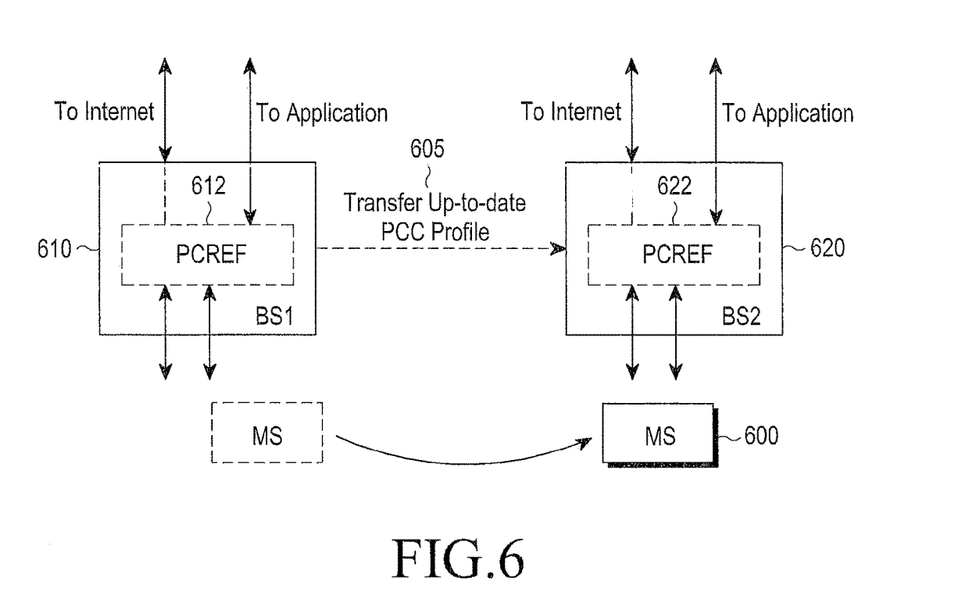
FIG. 6 illustrates a procedure for enforcing PCC rules in case of movement of an MS in a wireless communication system having a decentralized flat architecture according to an embodiment of the present disclosure.

FIG. 6 illustrates a procedure for enforcing PCC rules in case of movement of an MS in a wireless communication system having a decentralized flat architecture according to an embodiment of the present disclosure.

Referring to FIG. 6, an MS 600 moves from a BS1 610 to a BS2 620. The BS 610 and the BS 620 include PCREFs 612 and 622, respectively. The PCREF 612 of the BS 610 is activated as the MS 600 performs initial network entry to the BS 610 or the MS 600 enters the BS 610 through a handover, and stores and enforces information about PCC rules for the MS 600. The PCREF 622 of the BS 620 is activated as the MS 600 hands over to the BS 620, and receives information about PCC rules applicable to the MS 600 from the PCREF 612 of the BS 610, stores the information, and enforces a policy and charging for a data service of the MS 600.

The PCC rules for the MS 600 can be changed as a service of the MS 600 progresses, such that at the time of a handover, the PCREF 612 of the BS 610 transfers information about up-to-date PCC rules to the PCREF 622 of the BS 620. After the handover, the BS 610 does not involve PCC for a new flow generated for the MS 600 any longer. Once the MS 600 establishes a new session for a new flow in the BS 620, then the PCREF 622 of the BS 620 modifies and stores the PCC rules for the MS 600 and thereafter, upon occurrence of a handover, the PCREF 622 of the BS 620 can transfer the PCC rules to the new BS.

As such, an embodiment of the present disclosure activates a PCREF having PCRF and PCEF functions in a new BS as an MS moves, thereby implementing a decentralized flat network architecture.

When the MS moves to a new cell, to support consistent user policy and charging policy in both a previous BS and a new BS, information about PCC rules applicable to the new BS is transferred from the previous BS to the new BS during a handover, and information about user policy and charging policy applicable to the new BS is set by the PCREF of the previous BS based on policy and charging information related to a service the MS is currently using through the previous BS. As a simple example, if available service types and allocating bandwidths are limited according to a user policy, the PCREF of the previous BS can set PCC rules to be applied to the new BS, considering a service type, the number of services, and a bandwidth used in the previous BS.

To collect coherent charging information for an MS, information of a charging server allocated based on charging rules in the previous BS is included in the information on the PCC rules that is transferred to the new BS during the handover. In this way, coherent rules are applied through the same charging server for the use of data provided through the new BS and the charging server can efficiently collect charging data.

Figure 7:
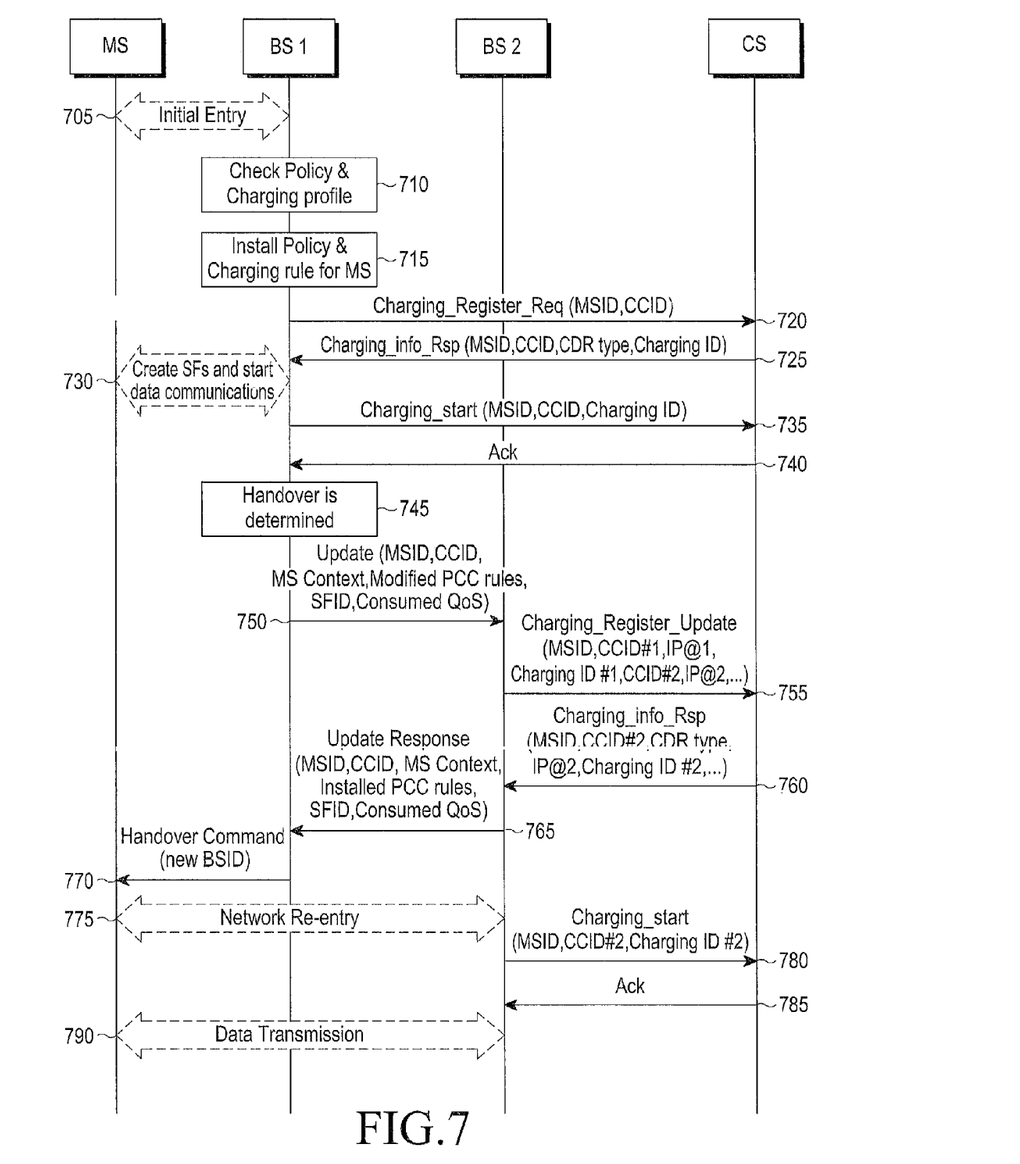
FIG. 7 illustrates a signal procedure for transferring policy and charging information in a wireless communication system according to an embodiment of the present disclosure.

FIG. 7 illustrates a signal procedure for transferring policy and charging information in a wireless communication system according to an embodiment of the present disclosure.

Referring to FIG. 7, in operation 705, an MS performs initial network entry to a BS 1. In operation 710, the BS 1 reads policy and charging profile information for a newly connected MS from a memory or collects the policy and charging profile information from a database. In operation 715, the BS 1 sets PCC rules for the MS based on the policy and charging profile information. In operation 720, the BS 1 sends a Charging_Register_req message including an MS Identification (MSID) and a Charging Client Identity (CCID) (or a BSID of the BS 1 in another embodiment) to a Charging Server (CS), and in operation 725, the BS 1 receives a Charging_info_Rsp message including the MSID, the CCID, a Charging Data Record (CDR) type, and a charging ID from the CS in response to the Charging_Register_Req message. Herein, the CDR refers to a statistic collected for charging with respect to a chargeable communication event, for example, call connection, the use of a data service, or the like, and the CDR type can be determined by a service type, a connection path, or the like according to a communication standard.

In operation 730, the MS generates at least one Service Flow (SF) for a data service between the MS and the BS 1 and starts data communication through the SF. In operation 735, the BS 1 sends a Charging_start message including the MSID, the CCID, and a charging ID to the CS. In operation 740, the BS 1 receives an Acknowledgement (Ack) with respect to the Charging_start message from the CS. Although not shown, while performing data communication based on the PCC rules set in operation 715, the BS 1 can measure the amount of traffic of the data communication and report the measured traffic amount to the CS or report charging information corresponding to the measured traffic amount to the CS to allow the CS to performing charging on a real time basis or on a non-real time basis.

Once the MS moves from a cell of the BS 1 to a cell of a BS 2, the BS 1 determines a handover of the MS in operation 745. In another embodiment, after determining to hand over, the MS can request a handover to the BS 1. In operation 750, the BS 1 sends an Update message to the BS 2 in response to the handover of the MS. The Update message includes the MSID, the CCID, an MS context, changed PCC rules, a Service Flow Identification (SFID), a QoS currently consumed by each SF. The changed PCC rules can be reconfigured by modifying the PCC rules generated for the MS in such a way that the PCC rules are applicable to the BS 2.

For example, if the MS can use a capacity of 100 MB based on initially set PCC rules and the MS has consumed a data service of 10 MB when handing over, the BS 1 modifies an available capacity for QoS control in the PCC rules into 90 MB, and if necessary, additionally modifies charging rules corresponding to the modified capacity. The PCC rules including the modification are transferred to the BS 2. In another embodiment, consumed QoS information indicating the consumed data capacity is transferred to the BS 2, together with the PCC rules.

In operation 755, the BS 2 sends a Charging_Register_Update message including the MSID, a CCID #1 (a CCID received from the BS 1), an IP@1 (an MS IP address allocated by the BS 1), a charging ID, a newly allocated CCID #2 (a BSID of the BS 2), and IP@2 (an MS IP address allocated by the BS 2) to the CS in response to reception of the Update_message in operation 755, and receives a Charging_info_Rsp message including updated charging information that includes the MSID, the CCID, a CDR type, an IP address, and a charging ID from the CS in response to the Charging_Register_Update message in operation 760. According to implementation, a previous charging ID can be reused instead of the updated charging ID. In operation 765, the BS 2 sends an Update Response message to the BS 1. The Update Response message includes the MSID, an MS context, PCC rules installed in the BS 2, the SFID, and a consumed QoS. In operation 770, the BS 1 sends a Handover Command including a new BSID indicating the BS 2 to the MS to command a handover. Operation 770 can be performed prior to operation 750 according to implementation.

In operation 775, the MS sets up connection with the BS 2 in response to the connection request message to set up connection with the BS 2. In operations 780 and 785 after setup of the connection between the MS and the BS 2, the BS 2 sends a Charging_start message including the MSID, the CCID, and the charging ID to the CS and receives an Ack with respect to the Charging_start message to allow charging with respect to communication of the MS in the BS 2. The Charging_start message sent from the BS 2 includes the charging ID allocated in operation 760. In operation 790, the MS performs data communication in the BS 2. Although not shown, while performing data communication based on the PCC rules acquired in operation 750, the BS 2 measures the amount of traffic of data communication and report the measured traffic amount to the CS to allow the CS to perform charging on a real time basis or a non-real time basis.

Figure 8:
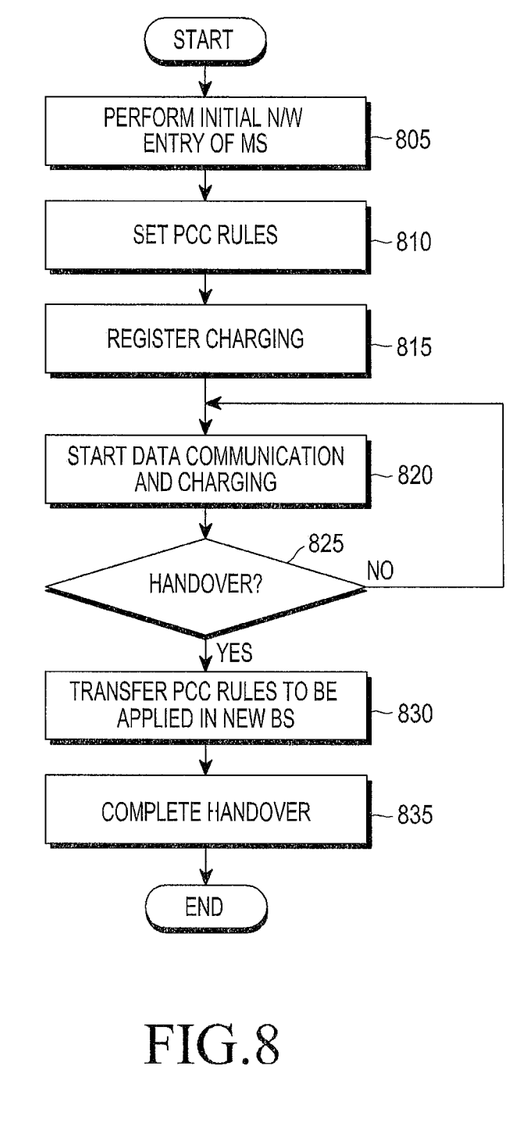
FIG. 8 is a flowchart illustrating a process of transferring PCC rules at a BS according to an embodiment of the present disclosure.

FIG. 8 is a flowchart illustrating a process of transferring PCC rules at a BS according to an embodiment of the present disclosure.

Referring to FIG. 8, the BS performs a procedure of initial network entry for an MS in operation 805, and sets PCC rules for the MS in operation 810. To this end, the BS reads information necessary for generation of the PCC rules from a memory and collects the necessary information from an external entity such as an SPR, a UDR, and an AF. In operation 815, the BS registers charging for the MS in the CS to be allocated with a charging ID. In operation 820, if the MS starts data communication, the BS performs charging with respect to the data communication. Charging information collected as a result of the charging can be periodically or aperiodically reported to the CS.

In operation 825, the BS determines whether a handover is requested for the MS. If a received signal strength of the BS for which the MS makes a report is good and received signal strengths of other BSs are weak, a handover is not necessary. Otherwise, the BS determines a handover to a target BS for the MS. In another embodiment, the BS receives a request for the handover to the target BS from the MS and determines the handover of the MS.

When determining the handover of the MS, the BS reconfigures PCC rules to be used by the target BS and transfers the PCC rules to the target BS in operation 830. The transferred PCC rules may be reconfigured by modifying PCC rules previously used in the BS. If needed, information indicating a QoS consumed in the BS may be transferred to the target BS, together with the PCC rules. In operation 835, the BS completes the handover. The PCC rules and the MS context for the MS may be maintained as desired and then may be deleted. That is, the BS does not need to manage the PCC rules for the MS, which has handed over to another BS, in the activated state and modification and control of the PCC rules are turned over to the another BS.

Other effects that may be obtained or expected from the embodiment of the present disclosure are explicitly or implicitly disclosed in the detailed description of the embodiment of the present disclosure. That is, various effects expected from the embodiment of the present disclosure have been disclosed in the detailed description of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing policy and charging control (PCC) by a base station (BS) in a decentralized network architecture, the method comprising:
    performing, at the BS, a procedure of initial network entry of a mobile station (MS);
    determining first PCC rules relating to a user policy and changing control for the MS based on at least one of subscription information and application information regarding the MS;
    performing, at the BS, data communication with the MS based on the first PCC rules;
    if the MS hands over from a BS to a target BS, generating, at the BS, second PCC rules to be enforced by the target BS, wherein the second PCC rules are determined based on an amount of data consumed while the BS communicates with the MS; and
    transferring, at the BS, the second PCC rules to the target BS in order that the target BS uses the second PCC rules for data communication with the MS.

2. The method of claim 1, wherein the transferring the second PCC rules to the target BS comprises sending a message including at least one of the second PCC rules and consumed quality-of-service (QoS) information to the target BS.

3. The method of claim 1, wherein the first PCC rules and the second PCC rules comprise sets of information, which allow detection of a preset event for a service flow and provide parameters for policy control and charging control.

4. The method of claim 1, wherein the second PCC rules are generated by the BS by reflecting policy and charging information related to a service that the MS is using through the BS.

5. The method of claim 1, further comprising:
    requesting the MS to hand over from the BS to the target BS.

6. A method for performing policy and charging control (PCC) by a base station (BS) in a decentralized network architecture, the method comprising:

receiving, at the BS, first PCC rules relating to a user policy and charging control for a mobile station (MS) from a previous BS if the MS hands over to a BS from the previous BS;

performing, at the BS, data communication with the MS based on the first PCC rules; and if the MS hands over from the BS to a target BS, generating, at the BS, second PCC rules to be enforced by the target BS, wherein the second PCC rules are determined based on an amount of data consumed while the BS communicates with the MS; and transferring, at the BS, the second PCC rules to the target BS in order that the target BS uses the second PCC rules for data communication with the MS.

7. The method of claim 6, wherein the transferring the second PCC rules to the target BS comprises sending a message including at least one of the second PCC rules and information about a quality of service (QoS) consumed by the BS, to the target BS.

8. The method of claim 6, wherein the first PCC rules and the second PCC rules comprise sets of information, which allow detection of a preset event for a service flow and provide parameters for policy control and charging control.

9. The method of claim 6, wherein the second PCC rules are generated by the BS by reflecting policy and charging information related to a service that the MS is using through the BS.

10. The method of claim 6, further comprising:
requesting the MS to hand over from the BS to the target BS.

11. A base station (BS) for performing policy and charging control (PCC) in a decentralized network architecture, the BS comprising:

a wireless transceiver configured to perform a procedure of initial network entry of a mobile station (MS);

a hardware controller configured to:
determine first PCC rules relating to a user policy and charging control for the MS based on at least one of subscription information and application information regarding the MS,
perform data communication with the MS based on the first PCC rules, and
if the MS hands over from a BS to a target BS, generate second PCC rules to be enforced by the target BS, wherein the second PCC rules are determined based on an amount of data consumed while the BS communicates with the MS; and a network transceiver configured to transfer the second PCC rules from the BS to the target BS in order that the target BS uses the second PCC rules for data communication with the MS.

12. The BS of claim 11, wherein the network transceiver is configured to send a message including at least one of the second PCC rules and consumed quality-of-service (QoS) information to the target BS.

13. The BS of claim 11, wherein the first PCC rules and the second PCC rules comprise sets of information, which allow detection of a preset event for a service flow and provide parameters for policy control and charging control.

14. The BS of claim 11, wherein the second PCC rules are generated by the BS by reflecting policy and charging information related to a service the MS is using.

15. The BS of claim 11,
wherein the wireless transceiver is further configured to request the MS to hand over to the target BS.

16. A base station (BS) for performing policy and charging control (PCC) in a decentralized network architecture, the BS comprising:

a network transceiver configured to receive first PCC rules relating to a user policy and charging control for a mobile station (MS) from a previous BS if the MS hands over from the previous BS to a BS; and a hardware controller configured to:
perform data communication with the MS based on the first PCC rules and
if the MS hands over from the BS to a target BS, generate second PCC rules to be enforced by the target BS, wherein the second PCC rules are determined based on an amount of data consumed while the BS communicates with the MS, wherein the second PCC rules are transferred from the BS to the target BS by the network transceiver in order that the target BS uses the second PCC rules for data communication with the MS.

17. The BS of claim 16, wherein the network transceiver is configured to send a message including at least one of the second PCC rules and information about quality-of-service (QoS) consumed by the BS, to the target BS.

18. The BS of claim 16, wherein the first PCC rules and the second PCC rules comprise sets of information, which allow detection of a preset event for a service flow and provide parameters for policy control and charging control.

19. The BS of claim 16, wherein the second PCC rules are generated by the BS by reflecting policy and charging information related to a service that the MS is using through the BS.

20. The BS of claim 16, wherein a serving BS is configured to request the MS to hand over to the target BS.

* * * * *